US010460055B1

(12) United States Patent
Gogoi et al.

(10) Patent No.: US 10,460,055 B1
(45) Date of Patent: Oct. 29, 2019

(54) MODELING OF SEQUENTIAL CIRCUIT DEVICES OF MULTI-CLOCK DOMAIN IC DESIGN FOR A TRANSIENT VECTORLESS POWER ANALYSIS

(71) Applicant: CADENCE DESIGN SYSTEMS, INC., San Jose, CA (US)

(72) Inventors: Yuvaraj Gogoi, Bangalore (IN); Bhuvnesh Kumar, Faridabad (IN); Anshu Mani, Noida (IN); Suketu Desai, Milpitas, CA (US)

(73) Assignee: Cadence Design Systems, Inc., San Jose, CA (US)

( * ) Notice: Subject to any disclaimer, the term of this patent is extended or adjusted under 35 U.S.C. 154(b) by 38 days.

(21) Appl. No.: 15/955,497

(22) Filed: Apr. 17, 2018

(51) Int. Cl.
*G06F 17/50* (2006.01)

(52) U.S. Cl.
CPC ...... *G06F 17/5009* (2013.01); *G06F 2217/02* (2013.01); *G06F 2217/06* (2013.01); *G06F 2217/78* (2013.01); *G06F 2217/84* (2013.01)

(58) Field of Classification Search
CPC .................................................. G06F 17/5009
USPC ........................................................ 716/102
See application file for complete search history.

(56) References Cited

U.S. PATENT DOCUMENTS

| 6,611,945 | B1* | 8/2003 | Narasimhan | G06F 17/5022 716/103 |
| 10,248,746 | B1* | 4/2019 | Bisht | G06F 17/5022 |
| 2004/0019859 | A1* | 1/2004 | Ravi | G06F 17/5022 716/103 |
| 2007/0022395 | A1* | 1/2007 | Ravi | G06F 17/5022 716/104 |
| 2008/0189086 | A1* | 8/2008 | Ford | G06F 17/5045 703/2 |
| 2015/0154330 | A1* | 6/2015 | Yachide | G06F 17/5022 716/102 |

* cited by examiner

*Primary Examiner* — Suresh Memula
(74) *Attorney, Agent, or Firm* — Eric L. Sophir; Dentons US LLP

(57) ABSTRACT

A computer performing a transient vectorless power analysis of a multi-clock domain integrated circuit (IC) design may execute a scheduling cycle based on the dominant clock frequency and schedule events based on comparing instance clock frequencies with the dominant clock frequency. If the instance clock frequency matches the dominant clock frequency, the computer may schedule a single event per scheduling cycle for the sequential circuit devices driven by the respective instance clocks. If the instance clock frequency is faster than the dominant clock frequency, the computer may schedule number of events per scheduling cycle based on the ratio of the instance clock frequency to the dominant clock frequency. If the instance clock frequency is less than the dominant clock frequency, the computer may schedule a single event per scheduling cycle if the computer determines that there is a triggering edge of the instance clock within the scheduling cycle.

20 Claims, 5 Drawing Sheets

MODELING OF SEQUENTIAL CIRCUIT DEVICES OF MULTI-CLOCK DOMAIN IC DESIGN FOR A TRANSIENT VECTORLESS POWER ANALYSIS

TECHNICAL FIELD

This application relates generally to power analysis of an integrated circuit (IC) design and more specifically to transient vectorless power analysis of sequential circuit devices operating at different frequencies in multi-clock domain synthesized circuit.

BACKGROUND

Modern semiconductor based integrated circuits (ICs) are incredibly complex and contain millions of circuit devices, such as transistors, and millions of interconnections between the circuit devices. Designing, testing, and verifying the functionality of such complex circuits cannot be accomplished manually, and circuit designers use computer based Electronic Design Automation (EDA) tools for schematics, layouts, simulation, and verification of the complex circuits. In additional to designing an IC with the correct functionality, another equally significant function of the EDA tools is to optimize the IC design. One of the optimization targets is to reduce power consumption by the fabricated IC. In addition to consuming less power and offering a longer battery life, an IC with reduced power consumption generates less heat and does not require elaborate heat dissipation mechanism. In this age of portable and yet incredibly complex electronics, ICs with reduced power consumption have therefore been increasingly relevant and sought after.

To allow a circuit designer to optimize power consumption, EDA tools offer power consumption verification of an IC design. Conventional EDA tools generally use vector-based power analysis, in which an IC design is simulated by feeding a test vector of inputs. The simulation then generates value change dump (VCD) files based on the simulation. The VCD files can be parsed to determine the current flow through circuit instances in the IC design. The current flow can be then used to calculate the power consumed by the circuit instances. However, as the complexity of ICs has been increasing exponentially, vector-based power analysis has become computationally expensive as the entire IC has to be simulated for multiple clock-cycles to generate the VCD files. Furthermore, significant computation resources have to be expended to parse the generated VCD files, determine the current flowing through various circuit instances, and calculate the power consumed by the IC.

Vectorless power analysis, which may heuristically model the transient power consumption for both sequential and combinational circuit devices in an IC design, may be more computationally efficient than a VCD based power analysis. However, conventional vectorless power analysis technology may not be accurate for IC designs including multiple clock domains. For example, FIGS. 1A and 1B show the inaccuracies when a conventional vectorless power analysis technology is used in an IC design that includes multiple clock domains. In FIG. 1A, the dominant clock signal 101 has a frequency of 2 GHz, faster than the frequency (1 GHz) of an instance clock signal 102 for a sequential circuit device. As shown herein, if a scheduling cycle includes two rising edges 107a, 107b of the dominant clock signal 101, then two rising edges 103a, 103b for the instance clock signal 102 may be scheduled as well. However, the instance clock signal 102 has one rising edge 103a for the scheduling cycle and the conventional vectorless power analysis technology toggles twice the state of the sequential circuit device driven by the instance clock signal 102 thereby generating a pessimistic power analysis result. In FIG. 1B, the dominant clock signal 104 has a frequency of 1 GHz and is slower than an instance clock signal 105 with a frequency of the 2 GHz. A scheduling cycle includes two rising edges 108a, 108b of the dominant clock signal 104. However, the scheduling cycle includes four rising edges 106a, 106b, 106c, 106d of the instance clock signal 105. In a conventional vectorless power analysis, only the first two rising edges 106a, 106b may be scheduled, thereby generating an overly optimistic power analysis result. In both instances, the power analysis result is inaccurate: in the first instance, the power consumption is shown to inaccurately higher, and in the second instance, the power consumption is shown to be inaccurately lower.

SUMMARY

What is therefore desired is vectorless power analysis systems and methods capable of performing power analysis of an integrated circuit design having multiple clock domains and generating an accurate power consumption profile of the integrated circuit design.

Embodiments disclosed herein attempt to solve the aforementioned problems and may provide solutions to other technological problems as well. The embodiments disclosed herein describe a computer that may perform transient vectorless power analysis for an integrated circuit (IC) having multiple clock domains. The computer may identify the dominant clock driving the majority of sequential circuit devices in the IC design and execute a scheduling cycle based on the dominant clock. The computer may propagate other instance clocks to the respective the sets of the sequential circuit devices. To accurately model the power consumption of the sequential circuit devices driven by instance clocks other than the dominant clock, the computer may compare the frequency of the instance clocks with the frequency of the dominant clock. If the instance clock frequency matches the dominant clock frequency, the computer may schedule a single event per scheduling cycle for the sequential circuit devices driven by the respective instance clocks. If the instance clock frequency is faster than the dominant clock frequency, the computer may schedule number of events per scheduling cycle based on the ratio of the instance clock frequency to the dominant clock frequency. If the instance clock frequency is less than the dominant clock frequency, the computer may schedule a single event per scheduling cycle if the computer determines that there is a triggering edge of the instance clock within the scheduling cycle. Therefore, the computer may more accurately perform transient power consumption analysis unlike the conventional methods that generate either inaccurately pessimistic or optimistic results.

In an embodiment, a computer implemented method comprises receiving, by a computer, one or more integrated circuit (IC) design files containing data records of a plurality of sequential and combinational circuit devices forming an IC design and one or more power characteristics file containing power profiles of the circuit devices; executing, by the computer, a scheduling cycle for the plurality of sequential and combinational circuit devices forming the IC design based on a frequency of the dominant clock in the IC design; propagating, by the computer, at least one instance clock in the IC design; scheduling, by the computer for the scheduling cycle, one or more toggling events of a sequential circuit device driven by the instance clock based on a difference in frequency of the dominant clock and frequency of the instance clock; calculating, by the computer, transient power consumption of a portion of the IC design based on the one or more toggling events and a power profile of the sequential circuit device; and displaying, by the computer, the transient power consumption on a graphical user interface.

In another embodiment, system for circuit design comprises one or more computers comprising a non-transitory machine-readable media configured to store one or more integrated circuit (IC) design files containing data records of a plurality of sequential and combinational circuit devices forming an IC design and one or more power characteristics file containing power profiles of the circuit devices; at least one computer of the one or more computers, the at least one computer coupled to the non-transitory machine-readable media storing the one or more IC design files and the one or more power characteristics files and comprising a processor configured to: execute a scheduling cycle for the plurality of sequential and combinational circuit devices forming the IC design based on a frequency of the dominant clock in the IC design; propagate at least one instance clock in the IC design; schedule for the scheduling cycle, one or more toggling events of a sequential circuit device driven by the instance clock based on a difference in frequency of the dominant clock and frequency of the instance clock; calculate transient power consumption of a portion of the IC design based on the one or more toggling events and a power profile of the sequential circuit device; and display the transient power consumption on a graphical user interface In yet another embodiment, computer readable non-transitory medium contains one or more computer instructions, which when executed by a processor cause the processor to receive one or more integrated circuit (IC) design files containing data records of a plurality of sequential and combinational circuit devices forming an IC design and one or more power characteristics file containing power profiles of the circuit devices; execute a scheduling cycle for the plurality of sequential and combinational circuit devices forming the IC design based on a frequency of the dominant clock in the IC design; propagate at least one instance clock in the IC design; schedule for the scheduling cycle, one or more toggling events of a sequential circuit device driven by the instance clock based on a difference in frequency of the dominant clock and frequency of the instance clock; calculate transient power consumption of a portion of the IC design based on the one or more toggling events and a power profile of the sequential circuit device; and display the transient power consumption on a graphical user interface.

BRIEF DESCRIPTION OF THE DRAWINGS

The accompanying drawings constitute a part of this specification and illustrate embodiments of the subject matter disclosed herein.

DETAILED DESCRIPTION

Figure 1A:
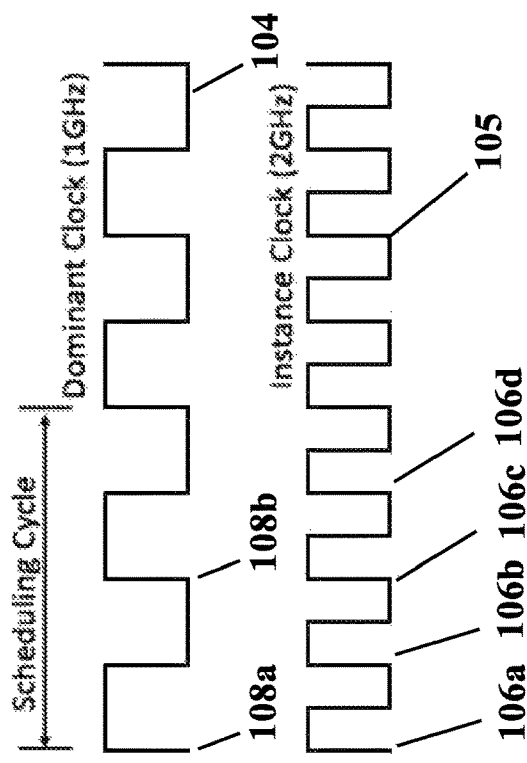
FIG. 1A and FIG. 1B show result of a conventional transient power analysis.
Figure 1B:
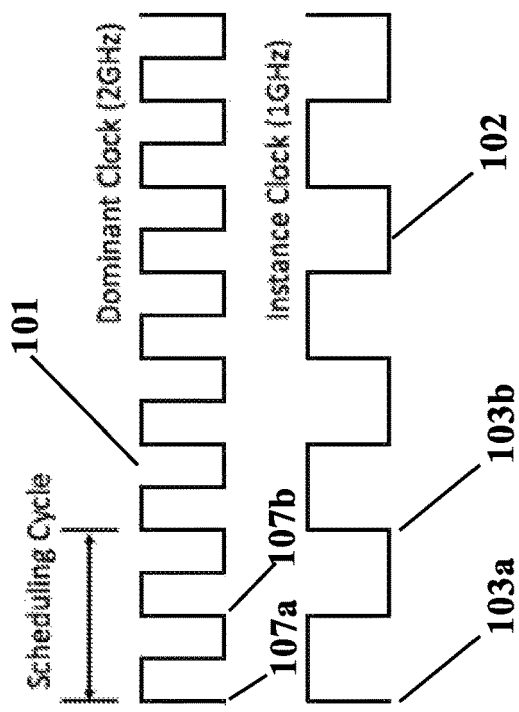

Reference will now be made to the illustrative embodiments illustrated in the drawings, and specific language will be used here to describe the same. It will nevertheless be understood that no limitation of the scope of the claims or this disclosure is thereby intended. Alterations and further modifications of the inventive features illustrated herein, and additional applications of the principles of the subject matter illustrated herein, which would occur to one ordinarily skilled in the relevant art and having possession of this disclosure, are to be considered within the scope of the subject matter disclosed herein. The present disclosure is here described in detail with reference to embodiments illustrated in the drawings, which form a part here. Other embodiments may be used and/or other changes may be made without departing from the spirit or scope of the present disclosure. The illustrative embodiments described in the detailed description are not meant to be limiting of the subject matter presented here.

Embodiments disclosed herein describe systems, methods, and products for transient vectorless power analysis of an integrated circuit (IC) with a multi-clock domain. Embodiments disclosed herein may implement a state propagation model for the vectorless power analysis, wherein a computer may propagate the states of the sequential circuit devices through the respective combinational logic cones for every scheduling cycle. The computer may generate a more accurate result than the conventional methods.

The computer may identify the dominant clock driving the majority of sequential circuit devices in the IC design and execute a scheduling cycle based on the dominant clock. The computer may propagate other instance clocks to the respective the sets of the sequential circuit devices. To accurately model the power consumption of the sequential circuit devices driven by instance clocks other than the dominant clock, the computer may compare the frequency of the instance clocks with the frequency of the dominant clock. If the instance clock frequency matches the dominant clock frequency, the computer may schedule a single event per scheduling cycle for the sequential circuit devices driven by the respective instance clocks. If the instance clock frequency is faster than the dominant clock frequency, the computer may schedule number of events per scheduling cycle based on the ratio of the instance clock frequency to the dominant clock frequency. If the instance clock frequency is less than the dominant clock frequency, the computer may schedule a single event per scheduling cycle if the computer determines that there is a triggering edge of the instance clock within the scheduling cycle. Therefore, the computer may more accurately perform transient power consumption analysis unlike the conventional methods that generate either inaccurately pessimistic or optimistic results.

The computer may compute transient power for each instance of the IC design, based on the scheduling of events as detailed above. The computer may retrieve from power characteristics library files, power consumption profile of toggled flops during the scheduled events and power consumption profiles of combinational logic devices in the downstream logic cones of the respective toggled flops. The downstream logic cones may propagate the state of the currently activated flops to a subsequent set of flops for the next scheduling cycle. In other words, the computer may determine if the respective circuit devices are active during the scheduling cycle and calculate the transient power consumption. To calculate the transient power consumption, in some embodiments, the computer may determine the transient current across the instances (both sequential and combinational) in the IC design. The computer may then output the transient power consumption and/or the transient current through a graphical user interface (GUI).

Figure 2:
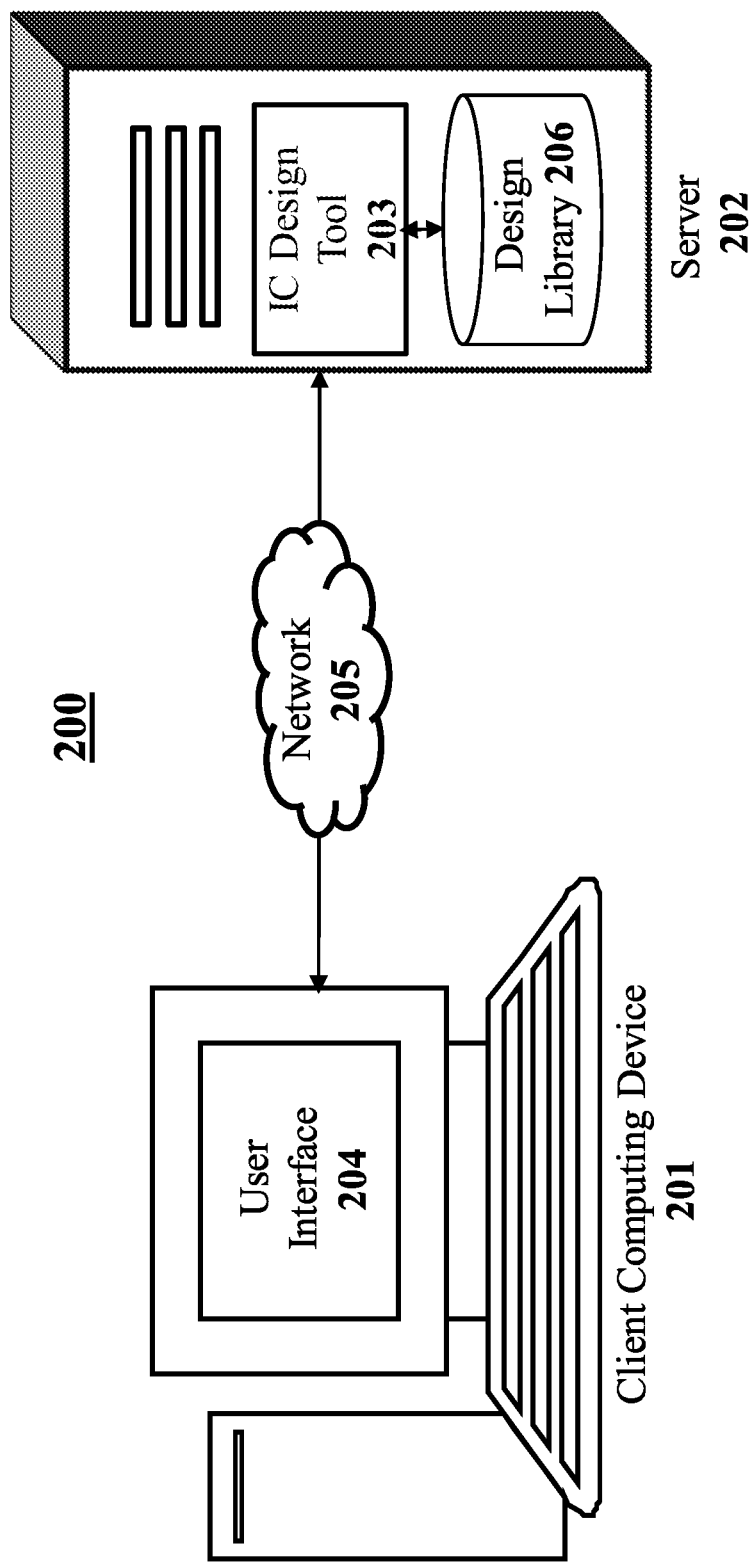
FIG. 2 shows an exemplary system for modeling of sequential elements in a multi-clock domain integrated circuit (IC) design for transient vectorless power analysis.

FIG. 2 illustrates an electronic design automation (EDA) system 200, according to an exemplary embodiment. The electronic design automation system 200 may include any number of computing devices; the exemplary embodiment may include a client computing device 201 and a server 202. One or more components of the electronic design automation system 200 may be grouped and referred to as an electronic design automation tool (or EDA tool). The client 201 may be connected to the server 202 via hardware and software components of one or more networks 205. A network 205 may also connect various computing devices with databases or other components of the system 204). Examples of the network 105 include, but are not limited to, Local Area Network (LAN), Wireless Local Area Network LAN), Metropolitan Area Network (MAN), Wide Area. Network (WAN), and the Internet. The communication over the network 205 may be performed in accordance with various communication protocols, such as Transmission Control Protocol and Internet Protocol (TCP/IP), User Datagram Protocol (IMP), and IEEE communication protocols.

A client computing device 201 may be any computing device comprising a processor/microcontroller and/or any other electronic component that performs one or more operations according to one or more programming instructions. The examples of the computing device may include, but are not limited to, a desktop computer, a laptop, a personal digital assistant (PDA), a smartphone, a tablet computer, and the like. The client computing device 201 may be configured to communicate with one or more servers 202 of the system 200 through one or more networks 205, using wired and/or wireless communication capabilities. A user interface 204 in the client computing device 201 may include a Graphical User Interface (GUI) that renders an interactive, graphical representation of an IC design, layout, schematic, or other logical representation of an IC that is being designed, optimized, and verified using an IC design tool 203. The GUI 204 may provide interactive elements, such as graphical representations of IC design elements for a user to manipulate, optimize, and/or verify the IC design layout. In some embodiments, the user interface 204 may include a text based interface allowing the user to enter manual commands for designing, optimizing, and verifying the IC design layout. The user interface 204 may render the results of various verification commands such as power verification commands.

A server 202 may be accessible to the client device 201 via one or more networks 205. The server 202 may be any computing device comprising a processor and other computing hardware configured to execute an IC design tool 203 software module (e.g., EDA design or verification software) that may analyze, optimize, and verify an IC design. In operation, using a client device 201 to access a design tool 203 hosted on a server 202 over a network 205, a circuit designer may interact with the IC design tool 203, through a number of input devices of the client device 201, such as by inputting a selection as with a mouse or inputting a request as with a keyboard. The IC design tool 203 may generate any number of graphical interface 204 responses based on the inputs received from the client device 201, and then send the data back to the client device 201 to be rendered on the GUI 204.

The server 202 may execute one or more component software modules of the IC design tool 203 software program, which may be a software program that allows users (e.g., engineers, circuit designers) to design, optimize, and verify circuit designs through software modules. The IC design tool 203 may provide users with interactive design interfaces 204 for designing an IC and the various design elements, execute automated optimization processes, execute automated layout-generation processes, and execute verification processes. The server 202 may comprise, or may be in networked-communication with, non-transitory machine-readable media configured to store a netlist of or any other file including records of IC design elements, which may be a machine-readable computer file or a design database containing one or more records of design elements (e.g., circuit devices, pcells, fixed cells) of the IC design. In operation, the IC design tool 203 may analyze and optimize the design elements of the netlist or any other type of file associated with the IC design. Non-limiting examples of circuit devices may include memory devices or sequential devices (e.g., D flip hops, T flip-flops, SR flip flops, JK flip flops), combination logic gates (e.g., AND, OR, NOT, NOR, NAND, XOR), and multiplexers, among others. The netlist or any other type of file may also include records of a plurality of nets. The nets may be the records associated with the wires interconnecting the plurality of circuit devices. In some embodiments, the non-transitory machine readable media may store IC design in a hardware description language, such as VHDL or Verilog. The non-transitory machine readable media may also store one or more power characteristics library files. The power characteristics library files may contain transient power consumption profile of the circuit devices in the IC design. The IC design tool 203 may further verify the functionality of the IC design, for example, whether the IC design performs within one or more constraints. For instance, the IC design 203 may perform a power analysis to verify that an IC design or a portion thereof performs within a pre-selected power constraint.

The server 202 may include a design library 206 that is accessed by the IC design tool 203. The design library 206 may include instances of various circuit devices, for example, transistors used to layout an IC. In some embodiments, the design library 206 may include instances of pcells used by the IC design tool 203 to generate an IC layout. An instance of a pcell may represent electronic circuit devices such as a transistor, transmission line, or an optical fiber line. The IC design tool 203 may use instances of pcells in the design library 206 to generate a netlist of an IC that can be sent to a manufacturing facility for fabrication.

The exemplary system 200 is shown in FIG. 2 as comprising only one server 202 for ease of explanation. However, it should be appreciated that the system 200 may comprise a number of servers 202. In some embodiments, the system 200 may comprise multiple interconnected, networked servers 202, some of which may execute various software modules configured to manage and control the resources and performance of the system 100. In some embodiments, the servers 202 may have parallel architectures configured to support multi-threading on multi-core workstations to handle large designs. In such embodiments, the servers 202 may be configured for distributed processing. The server 202 may be logically and physically organized within the same or different devices or structures, and may be distributed across any number of physical structures and locations (e.g., cabinets, rooms, buildings, cities)

In operation, the system 200 may determine or receive an indication of the dominant clock within an IC design. The system 200 may then execute a scheduling cycle based on the dominant clock frequency. In some instances, the scheduling cycle may contain at least two cycles of the dominant clock. The system 200 may also propagate other instance clocks and schedule events for the sequential circuit devices connected to the instance clocks based on the difference in frequencies of the respective instance clocks and the dominant clock frequency. If the instance clock frequency matches the dominant clock frequency, the system 200 may schedule a single event per scheduling cycle for the sequential circuit devices driven by the respective instance clocks. If the instance clock frequency is faster than the dominant clock frequency, the system 200 may schedule number of events per scheduling cycle based on the ratio of the instance clock frequency to the dominant clock frequency. If the instance clock frequency is less than the dominant clock frequency, the system 200 may schedule a single event per scheduling cycle if the system 200 determines that there is a triggering edge of the instance clock within the scheduling cycle.

Figure 3:
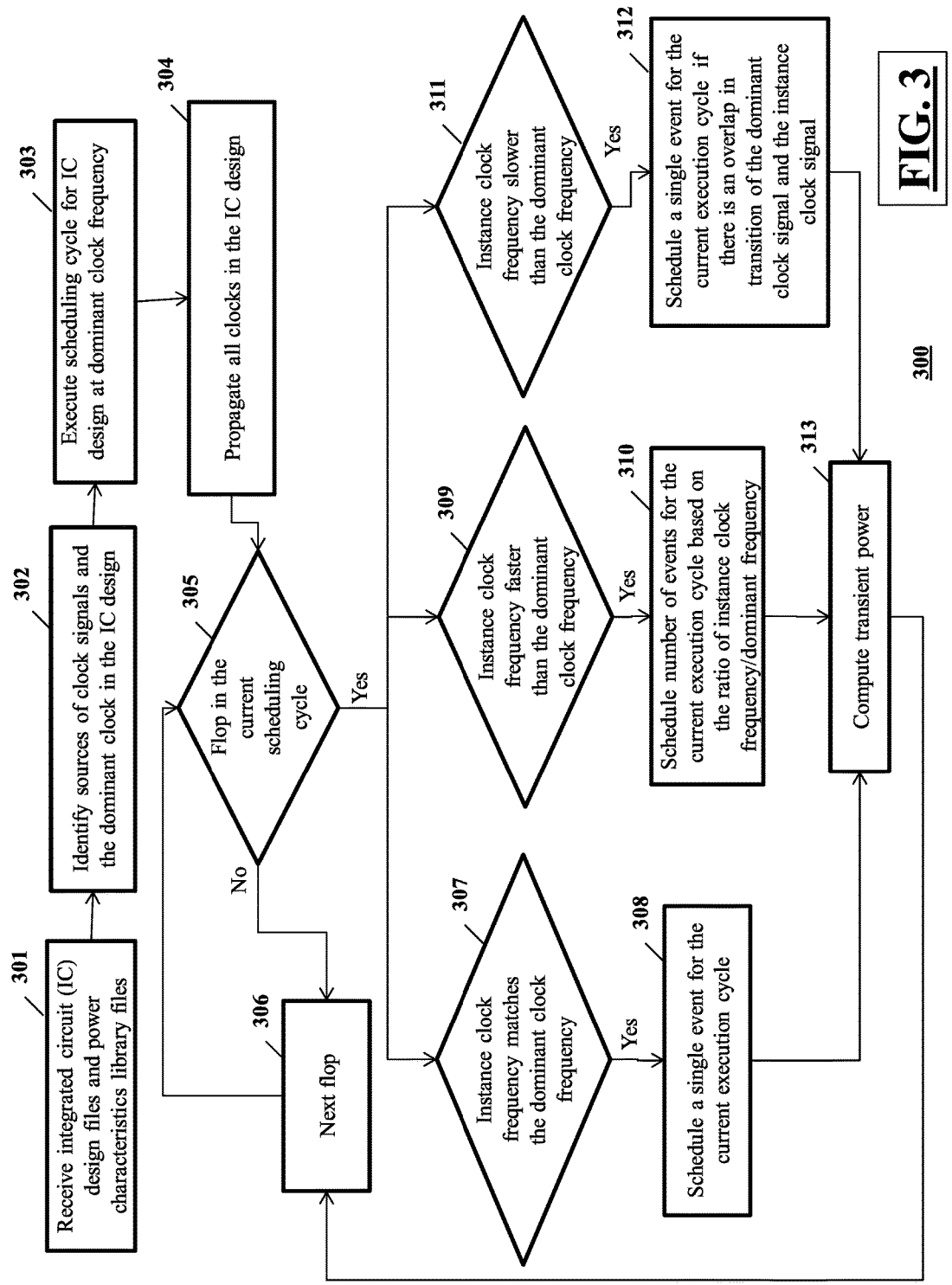
FIG. 3 shows an exemplary method of modeling of sequential elements in a multi-clock domain IC design for transient vectorless power analysis.

FIG. 3 shows an exemplary method for transient vectorless power analysis of multi-clock domain integrated circuit (IC). Although multiple computers and multiple databases may implement the various steps of the exemplary method 300, the following describes, for brevity, a computer and a database implementing the method 300. Furthermore, one having ordinary skill in the art understands that the method 300 may implement other alternative or additional steps than the one described below, and may skip one or more of the steps described below.

In a first step 301, the computer may receive integrated circuit (IC) design files and power characteristics library files. The IC design files may contain or form an IC design of which power consumption has to be verified using the embodiments of the disclosure. In some instances, the IC design files may be in hardware description language (HDL) format such as VHDL or Verilog. In other instances, the IC design files may be in a text format, such as a netlist. The IC design files may contain data records of sequential circuit devices such as flip-flops (referred to as flops in this disclosure for brevity), latches, and registers and combination circuit devices such as logic gates and inverters. The IC design files may also contain data records of nets interconnecting circuit devices. Furthermore, the IC design files may contain data records of circuit devices generating various clock signals and the data records of nets forming a plurality of clock networks. The power characteristics library files may contain data records or power profiles of transient power consumption of the circuit devices in the IC design. For example, the power characteristics library file may contain a data record or a power profile of a flop, wherein the data record includes a data field containing the amount of power consumed by the flop when the flop toggles. In a cell based IC design, the power characteristics library file may contain power profile of each type of cells in the IC design.

In a next step 302, the computer may identify sources of clock signals and the dominant clock in the IC design. In some instances, a circuit designer may identify the sources of clock signals in the IC design files. In other instances, the circuit designer may construct the sources of clock signals using a clock interface provided by the computer. In yet other instances, the computer may parse the IC design files to identify one or more sources of clock signals. The computer may identify the dominant clock in the IC design, based on the proportion of circuit devices driven by each clock. The dominant clock may generate clock signals to drive (or synchronize) the majority of circuit devices in the IC design.

In step 303, the computer may execute scheduling cycle for the IC design at the dominant clock frequency. In other words, the computer may execute a scheduler that operates on the dominant frequency. In some embodiments, the computer may execute a scheduling cycle for two rising edges (or two cycles) of the dominant clock. By executing the scheduling cycle for two cycles of the dominant clock (or an instance clock connected to a flop), the computer may capture two toggles of the flop. More specifically, if the state of the flop transitions from the low to high or vice-versa in a first clock cycle of the dominant clock or the instance clock, the computer may capture this transition and the subsequent transition in the second cycle of the dominant clock or the instance clock.

In step 304, the computer may propagate all clocks in the IC design. That is, the computer may begin the modelling of transient power consumption of the respective flops connected to the clocks. For example, the computer may activate, in a first scheduling cycle, a first set of flops connected to a first clock. Subsequently, the computer may activate in a second scheduling cycle, a second set of flops connected to the first clock. Likewise, the computer may activate, in the first scheduling cycle, a third set of flops connected to a second clock. Subsequently, the computer may activate in the second scheduling cycle, a fourth set of flops connected to the second clock. In this way, although the scheduling cycle is based on the dominant clock, the computer may propagate all the clock signals in the IC design.

In step 305, the computer may determine of a particular flop is in the current scheduling cycle. If the flop is not in the in the current scheduling cycle, the computer may execute steps 306 to pick another flop. If however the flop is in the current scheduling cycle, the computer may compare the frequency of an instance clock signal driving the flop with the frequency of the dominant clock signal and execute subsequent steps, as described below.

In step 307, the computer may determine if the instance clock frequency matches the dominant clock frequency. If the computer determines that the instance clock frequency matches the dominant clock frequency, the computer, in step 308, may schedule a single event for the current execution cycle. In other words, the computer may drive the flop synchronous with the dominant clock.

In an alternative step 309, the computer may determine if the instance clock frequency is faster than the dominant clock frequency. If the computer determines that the instance clock frequency is faster than the dominant clock frequency, i.e. the instance clock is faster than the dominant clock, the computer may have to schedule multiple events within a single scheduling cycle. The computer may calculate the maximum possible number of events in step 310 based on the ratio of frequency of the instance to the dominant clock. For example, if the frequency of the instance clock is 2 GHz and the dominant frequency is 1 GHz, then the computer may schedule 2*2 GHz/1 GHz, i.e. 4 events (including 2 rises and 2 falls of the instance clock) for a scheduling cycle. In some embodiments, the computer may calculate the number of events based on the function: ceiling (2*(instance clock frequency/dominant clock frequency)). In the instances of fractional ratios, for example where instance clock frequency is 3 GHz or 2.5 GHz and dominant clock frequency is 2 GHz, the computer may generate the number of events in a scheduling cycle based on a sequence of the scheduling cycles. For example, for the instance clock frequency of 3 GHz, the computer may schedule 3 events (2 rises+1 fall or 2 falls+1 rise) for each of a first scheduling cycle and a second scheduling cycle succeeding the first scheduling cycle. In another example, for the instance clock frequency of 2.5 GHz, the computer may schedule 2 events (1 rise+1 fall) for a first scheduling cycle and 3 events (either, 2 rises+1 fall or 1 fall+2 rises) in a second scheduling cycle succeeding the first scheduling cycle.

In an alternative step 311, the computer may determine if the instance clock frequency is slower than the dominant clock frequency. If the computer determines that the instance clock frequency is slower than the dominant clock frequency, the computer may execute step 312. In step 312, the computer may schedule a single event for the current execution cycle if the computer determines that there is an overlap in the transition of the dominant clock signal and the instance clock signal. In other words, if there is a transition of the instance clock signal within the current execution cycle, for example, a rising edge of the instance clock signal for rising edge triggered flops or a falling edge of the instance clock signal for falling edge triggered flops, the computer may schedule an event for the current execution cycle.

In step 313, the computer may compute transient power for each instance of the IC design, based on the scheduling of events as detailed in steps 307, 308; alternative steps 309, 310; and alternative steps 311, 312. The computer may retrieve from the power characteristics library files, power profiles of toggled flops during the scheduled events and power profiles of combinational logic devices in the downstream logic cones of the respective toggled flops. The downstream logic cones may propagate the state of the currently activated flops to a subsequent set of flops for the next scheduling cycle. In other words, the computer may determine if the respective circuit devices are active during the scheduling cycle and calculate the transient power consumption. To calculate the transient power consumption, in some embodiments, the computer may determine the transient current across the instances (both sequential and combinational) in the IC design. The computer may then output the transient power consumption and/or the transient current through a graphical user interface (GUI). In some embodiments, the computer may display the transient power consumption and/or the transient current for a predetermined number of scheduling cycles in a graphical format. The transient power consumption and/or transient current calculated and displayed by the computer may allow a circuit designer to further optimize the IC design.

Figure 4:
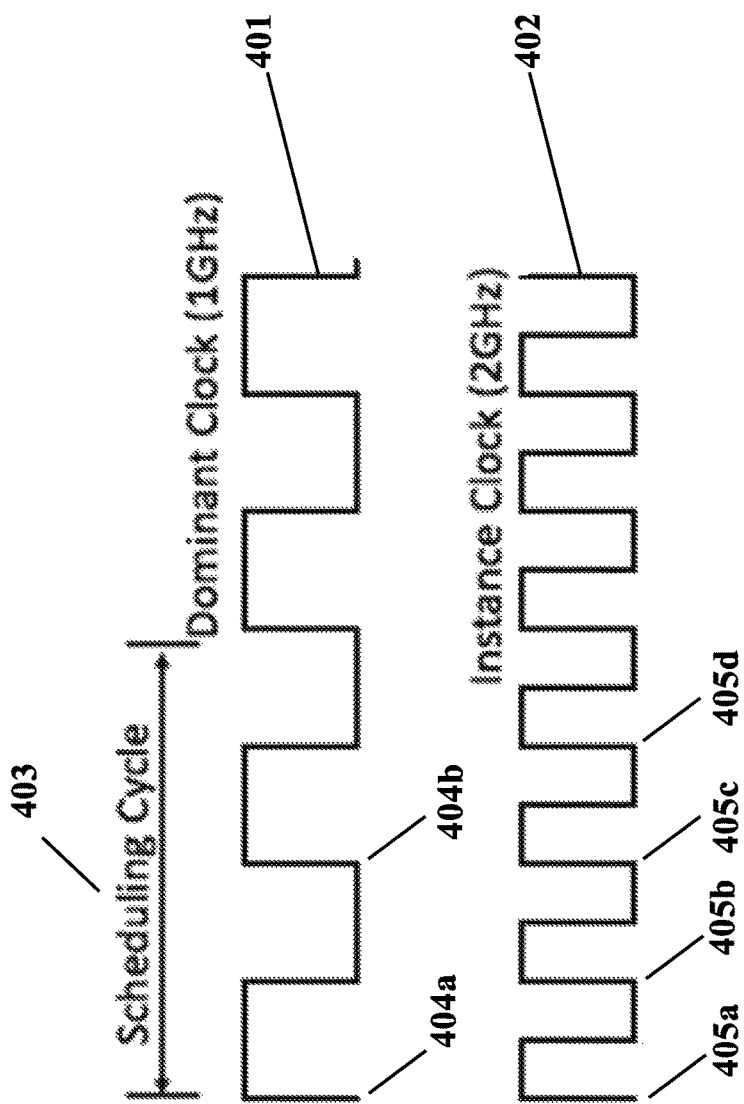
FIG. 4 shows transient vectorless power analysis of a multi-clock domain IC design wherein dominant clock frequency is lower than an instance clock frequency.

FIG. 4 shows an exemplary dominant clock signal 401 and an exemplary instance clock signal 402 for an integrated circuit (IC) design undergoing a power consumption analysis by an electronic design automation tool (EDA). As shown herein, the dominant clock signal 401, which may be driving a majority of the flops in the IC design, may have a lower frequency than the instance clock signal 402, which may be driving a flop not within the majority of flops. The EDA tool may select a scheduling cycle 403 based on the cycle of the dominant clock signal 401. As shown herein, the EDA tool may have selected the scheduling cycle 403 encompassing two cycles of the dominant clock signal 401. That is, the scheduling cycle 403 includes two rising edges 404a, 404b of the dominant clock signal 401.

As the instance clock signal 402 has a higher frequency than the dominant clock signal 401, the EDA tool may schedule the number of events for a flop (not shown) driven by the instance clock signal 402 based on the ratio of the frequencies of the instance clock signal 402 and the dominant clock signal 401. For example, if the frequency of the dominant clock signal is 1 GHz and the frequency of the instance clock signal is 2 GHz, the EDA tool may schedule 2 GHz/1 GHz, i.e. 2 events for the flop in the scheduling cycle 403. In other words, the EDA tool may consider the four rising edges 405a, 405b, 405c, 405d of the instance clock signal 402. Conventional methods would consider only the first two rising edges 405a, 405b, thereby generating an optimistic power analysis result. In contrast, the EDA tool may generate a more accurate and more realistic power analysis as all the rising edges 405a, 405b, 405c, 405d of the instance clock signal 402 within the scheduling cycle 403 are considered to drive the flop and the downstream logic cones.

Figure 5:
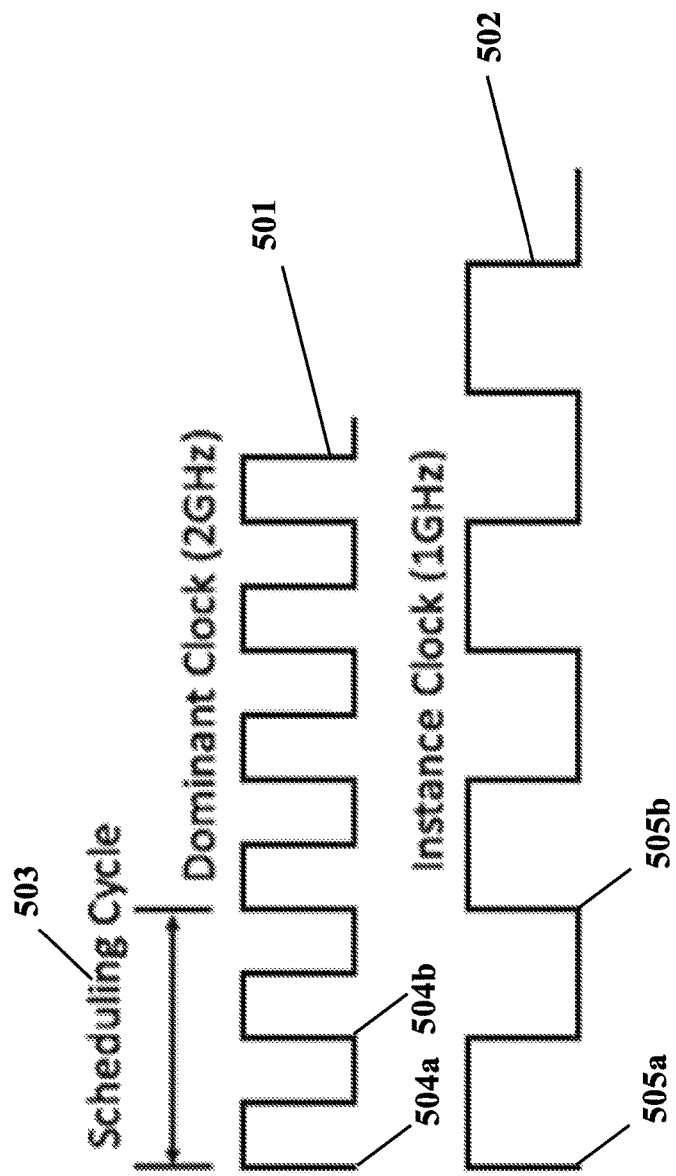
FIG. 5 shows transient vectorless power analysis of a multi-clock domain IC design wherein dominant clock frequency is higher than an instance clock frequency.

FIG. 5 shows an exemplary dominant clock signal 501 and an exemplary instance clock signal 502 for an integrated circuit (IC) design undergoing a power consumption analysis by an electronic design automation tool (EDA). As shown herein, the dominant clock signal 501, which may be driving a majority of the flops in the IC design, may have a higher frequency than the instance clock signal 502, which may be driving a flop not in the majority of flops. The EDA tool may select a scheduling cycle 503 based on the cycle of the dominant clock signal 501. As shown herein, the EDA tool may have selected the scheduling cycle 503 encompassing two cycles of the dominant clock signal 501. That is, the scheduling cycle 503 includes two rising edges 504a, 504b of the dominant clock signal 501.

As the instance clock signal 502 has a lower frequency than the dominant clock signal 501, the EDA tool may schedule an event for a flop (not shown) driven by the instance clock signal 502 provided the instance clock signal 502 toggles within the scheduling cycle 503. In an exemplary scenario, wherein the flops in the IC design are triggered during a rise edge of the clock signals 501, 502, the instance clock signal 502 has one rising edge 505a within the scheduling cycle 503. The EDA tool may consider the first rising edge 504a of the instance clock signal 502 during the scheduling cycle 503. Conventional methods would consider both of the first two rising edges 505a, 505b, thereby by generating a pessimistic power analysis result. In contrast, the EDA tool may generate a more accurate and more realistic power analysis as the rising edge 505a of the instance clock signal 502 within the scheduling cycle 503 is considered to drive the flop and the downstream logic cones.

The foregoing method descriptions and the process flow diagrams are provided merely as illustrative examples and are not intended to require or imply that the steps of the various embodiments must be performed in the order presented. The steps in the foregoing embodiments may be performed in any order. Words such as "then," "next," etc. are not intended to limit the order of the steps; these words are simply used to guide the reader through the description of the methods. Although process flow diagrams may describe the operations as a sequential process, many of the operations can be performed in parallel or concurrently. In addition, the order of the operations may be re-arranged. A process may correspond to a method, a function, a procedure, a subroutine, a subprogram, and the like. When a process corresponds to a function, the process termination may correspond to a return of the function to a calling function or a main function.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of this disclosure or the claims.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the claimed features or this disclosure. Thus, the operation and behavior of the systems and methods were described without reference to the specific software code being understood that software and control hardware can be designed to implement the systems and methods based on the description herein.

When implemented in software, the functions may be stored as one or more instructions or code on a non-transitory computer-readable or processor-readable storage medium. The steps of a method or algorithm disclosed herein may be embodied in a processor-executable software module, which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the embodiments described herein and variations thereof. Various modifications to these embodiments will be readily apparent to those skilled in the art, and the generic principles defined herein may be applied to other embodiments without departing from the spirit or scope of the subject matter disclosed herein. Thus, the present disclosure is not intended to be limited to the embodiments shown herein but is to be accorded the widest scope consistent with the following claims and the principles and novel features disclosed herein.

While various aspects and embodiments have been disclosed, other aspects and embodiments are contemplated. The various aspects and embodiments disclosed are for purposes of illustration and are not intended to be limiting, with the true scope and spirit being indicated by the following claims.

What is claimed is:

1. A computer implemented method comprising:
  receiving, by a computer, one or more integrated circuit (IC) design files containing data records of a plurality of sequential and combinational circuit devices forming an IC design and one or more power characteristics file containing power profiles of the circuit devices;
  executing, by the computer, a scheduling cycle for the plurality of sequential and combinational circuit devices forming the IC design based on a frequency of the dominant clock in the IC design;
  propagating, by the computer, at least one instance clock in the IC design;
  scheduling, by the computer for the scheduling cycle, one or more toggling events of a sequential circuit device driven by the instance clock based on a difference in frequency of the dominant clock and frequency of the instance clock;
  calculating, by the computer, transient power consumption of a portion of the IC design based on the one or more toggling events and a power profile of the sequential circuit device; and
  displaying, by the computer, the transient power consumption on a graphical user interface.

2. The method of claim 1, further comprising:
  in response to the computer determining that the frequency of the instance clock is higher than the frequency of the dominant clock:
    calculating, by the computer, an absolute value of the ratio of the frequency of the instance clock to the frequency of the dominant clock; and
    scheduling, by the computer for the scheduling cycle, the one or more toggling events of the sequential circuit device based on the absolute value of the ratio.

3. The method of claim 1, further comprising:
  in response to the computer determining that the frequency of the instance clock is lower than the frequency of the dominant clock:
    scheduling, by the computer for the scheduling cycle, one toggling event of the sequential circuit device when the computer determines that there is at least one edge transition of the instance clock in the scheduling cycle.

4. The method of claim 1, further comprising:
  in response to the computer determining that the frequency of the instance clock is equal than the frequency of the dominant clock:
    scheduling, by the computer for the scheduling cycle, one toggling event of the sequential circuit device.

5. The method of claim 1, wherein the scheduling cycle comprises at least two cycles of the dominant clock.

6. The method of claim 1, further comprising:
calculating, by the computer, the transient power consumption of the portion of the IC design based on power profiles of combinational circuit devices in a downstream logic cone of the sequential circuit device.

7. The method of claim 1, wherein the transient power consumption for a predetermined number of scheduling cycles is displayed graphically on the graphical user interface.

8. The method of claim 1, wherein the steps of the method are repeated for multiple scheduling cycles.

9. The method of claim 1, further comprising:
receiving, by the computer, one or more inputs identifying the dominant clock and the instance clock.

10. The method of claim 1, wherein the sequential circuit devices are selected from a group consisting of a D flip-flop, a T flip-flop, a JK flip-flop, and an SR flip-flop, and wherein the combinational circuit devices are selected from the group consisting of an OR gate, a NOR gate, an AND gate, a NAND gate, an XOR gate, a NOT gate, a multiplexer, and an inverter.

11. A system for circuit design, comprising:
one or more computers comprising a non-transitory machine-readable media configured to store one or more integrated circuit (IC) design files containing data records of a plurality of sequential and combinational circuit devices forming an IC design and one or more power characteristics file containing power profiles of the circuit devices;
at least one computer of the one or more computers, the at least one computer coupled to the non-transitory machine-readable media storing the one or more IC design files and the one or more power characteristics files and comprising a processor configured to:
execute a scheduling cycle for the plurality of sequential and combinational circuit devices forming the IC design based on a frequency of the dominant clock in the IC design;
propagate at least one instance clock in the IC design;
schedule for the scheduling cycle, one or more toggling events of a sequential circuit device driven by the instance clock based on a difference in frequency of the dominant clock and frequency of the instance clock;
calculate transient power consumption of a portion of the IC design based on the one or more toggling events and a power profile of the sequential circuit device; and
display the transient power consumption on a graphical user interface.

12. The system of claim 11, wherein the processor is further configured to:
in response to the processor determining that the frequency of the instance clock is higher than the frequency of the dominant clock:
calculate an absolute value of the ratio of the frequency of the instance clock to the frequency of the dominant clock; and
schedule for the scheduling cycle, the one or more toggling events of the sequential circuit device based on the absolute value of the ratio.

13. The system of claim 11, wherein the processor is further configured to:
in response to the processor determining that the frequency of the instance clock is lower than the frequency of the dominant clock:
schedule for the scheduling cycle, one toggling event of the sequential circuit device when the computer determines that there is at least one edge transition of the instance clock in the scheduling cycle.

14. The system of claim 11, wherein the processor is further configured to:
in response to the processor determining that the frequency of the instance clock is equal than the frequency of the dominant clock:
schedule for the scheduling cycle, one toggling event of the sequential circuit device.

15. The system of claim 11, wherein the scheduling cycle comprises at least two cycles of the dominant clock.

16. The system of claim 11, wherein the processor is further configured to:
calculate the transient power consumption of the portion of the IC design based on power profiles of combinational circuit devices in a downstream logic cone of the sequential circuit device.

17. The system of claim 11, wherein the transient power consumption for a predetermined number of scheduling cycles is displayed graphically on the graphical user interface.

18. The system of claim 11, wherein the processor is further configured to:
receive one or more inputs identifying the dominant clock and the instance clock.

19. The system of claim 11, wherein the sequential circuit devices are selected from a group consisting of a D flip-flop, a T flip-flop, a JK flip-flop, and an SR flip-flop, and wherein the combinational circuit devices are selected from the group consisting of an OR gate, a NOR gate, an AND gate, a NAND gate, an XOR gate, a NOT gate, a multiplexer, and an inverter.

20. A computer readable non-transitory medium containing one or more computer instructions, which when executed by a processor cause the processor to:
receive one or more integrated circuit (IC) design files containing data records of a plurality of sequential and combinational circuit devices forming an IC design and one or more power characteristics file containing power profiles of the circuit devices;
execute a scheduling cycle for the plurality of sequential and combinational circuit devices forming the IC design based on a frequency of the dominant clock in the IC design;
propagate at least one instance clock in the IC design;
schedule for the scheduling cycle, one or more toggling events of a sequential circuit device driven by the instance clock based on a difference in frequency of the dominant clock and frequency of the instance clock;
calculate transient power consumption of a portion of the IC design based on the one or more toggling events and a power profile of the sequential circuit device; and
display the transient power consumption on a graphical user interface.

* * * * *